United States Patent [19]

Nadkarni

[11] Patent Number: 5,422,885
[45] Date of Patent: Jun. 6, 1995

[54] CONTENTION FREE LOCAL AREA NETWORK
[75] Inventor: Vijay J. Nadkarni, Naperville, Ill.
[73] Assignee: Motorola, Inc., Schaumburg, Ill.
[21] Appl. No.: 891,012
[22] Filed: Jun. 1, 1992
[51] Int. Cl.⁶ .................................................. H04J 3/02
[52] U.S. Cl. ................................ 370/85.4; 370/16.1; 370/85.1; 370/85.3; 370/85.11; 455/56.1
[58] Field of Search ............... 370/85.1, 85.2, 85.3, 370/85.4, 85.5, 85.9, 85.11, 85.12, 85.14, 85.15, 110.1, 67, 95.1, 95.3, 97, 16.1; 340/825.02, 825.05, 825.07, 825.08, 825.5; 455/14, 16, 17, 51.1, 56.1

[56] References Cited

U.S. PATENT DOCUMENTS

| | | | |
|---|---|---|---|
| 2,064,906 | 12/1936 | Green et al. | 370/85.15 |
| 4,686,671 | 8/1987 | Burian et al. | 370/85.14 |
| 4,789,982 | 12/1988 | Coden | 370/85.3 |
| 4,805,168 | 2/1989 | Kato | 370/85.11 |
| 4,816,825 | 3/1989 | Chan et al. | 370/85.3 |
| 4,864,576 | 9/1989 | Mark | 370/85.4 |
| 5,131,085 | 7/1992 | Eikill et al. | 395/325 |
| 5,179,548 | 1/1993 | Sandesara | 370/16.1 |
| 5,187,709 | 2/1993 | Williamson et al. | 370/85.3 |
| 5,274,841 | 12/1993 | Natarajan et al. | 455/56.1 |

Primary Examiner—Douglas W. Olms
Assistant Examiner—Shick Hom
Attorney, Agent, or Firm—Pedro P. Hernandez

[57] ABSTRACT

A contention free local area network includes a token passing control bus (102) and a data bus (104) coupled to a plurality of communication nodes (108, 112, 114, 116, 118, and 120). The control bus (102) allows for a transmit-enable token to be daisy-chained along the plurality of communication nodes. When one of the communication nodes wants to transmit a message, the node upon receiving the transmit-enable token holds the token until it transmits its message along a data bus (104) to the other communication nodes. Once the message is transmitted, the particular communication node releases the transmit-enable token, allowing the token to continue to be rotated among the plurality of communication nodes (108, 112, 114, 116, 118 and 120).

11 Claims, 4 Drawing Sheets

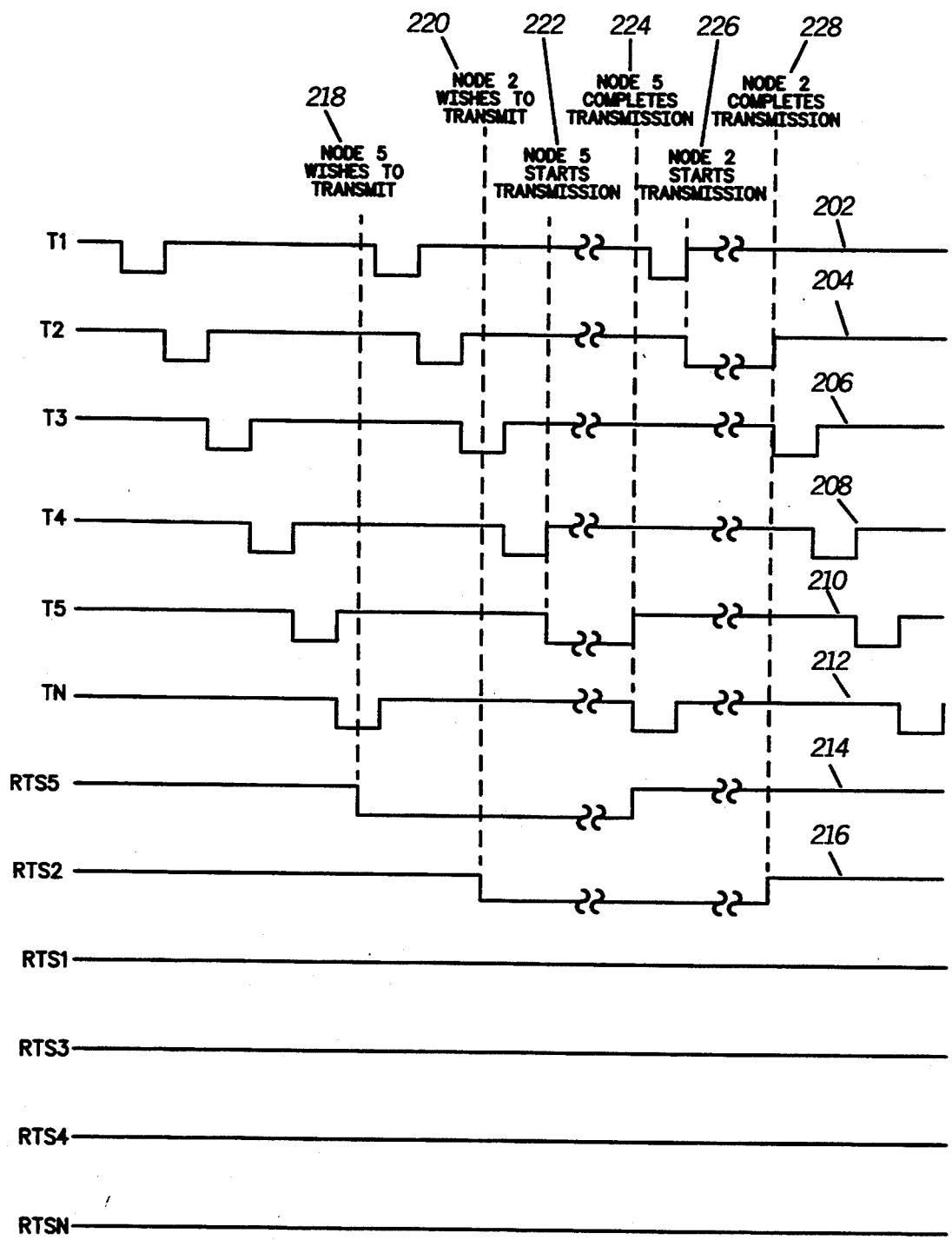

5,422,885

CONTENTION FREE LOCAL AREA NETWORK

TECHNICAL FIELD

This invention relates generally to the field of local area networks (LANs) and more specifically to a system and method for providing contention free transmission of messages.

BACKGROUND

Conventional local area networks come in two primary configurations, ring and multi-drop configurations. In a ring configuration, messages are passed from one node in the network to the next until they reach their destinations. Since a given node transmits a message directly to only the next node in the ring network, there is no possibility of message contention (collision) on a given internodal link. The drawback of the ring configuration is that not all nodes on the network can listen to a transmitted message simultaneously (i.e., it is not possible to "broadcast" the message to several nodes at any one given time).

In a multi-drop configuration, a single hardware bus unites all the nodes together. This allows the message transmitted by a single node to be received by all the other nodes simultaneously, a desirable feature in many real-time applications (e.g., such as in radio frequency communication systems which require messages to be sent to several repeaters in the system at approximately the same time). The drawback to this configuration, however, is that it is entirely possible for two or more nodes in the network to transmit a message simultaneously, causing message contention (collision) which results in corruption of the transmitted messages.

Other fairly elaborate LAN protocols, such as Carrier Sense Multiple Access (CSMA, such as found in Ethernet), Token Bus (involving passing a token in a message frame), and Arbitration by Master, among others, have been developed to minimize the contention that could occur on the LAN buses. The problem with most of these more sophisticated protocol networks is that they involve using expensive circuitry and IC's (such is the case with Ethernet and Token Bus configurations), or relatively complex software (such as with Arbitration by Master configurations) which result in expensive networks and/or long handshaking delays.

Presently, several types of local area networks are used in communication networks, with some of the more frequently used LANs being the Ethernet, Token Bus, LocalTalk and Token Ring networks. The Ethernet LAN uses a multi-drop configuration which employs a carrier sense multiple access contention scheme (CSMA) which minimizes collisions on the bus. Ethernet has a drawback in that it does not eliminate collisions entirely, something which is not acceptable in many communication systems. Ethernet systems typically employ a two conductor cable for operation. The Token Bus network is also a multi-drop network, the Token Bus however employs message embedded token passing to avoid collisions on the bus. Token Bus networks also employ two conductor cables, but require sophisticated electronics and software to implement the embedded token passing scheme.

The LocalTalk network is also configured as a multi-drop system but employs a software handshake protocol between the message source node and the destination node. LocalTalk networks require sophisticated software to implement the handshake routines. These handshakes reduce the maximum effective information transfer rate for the network. Finally, Token Ring networks avoid all contentions between communication nodes wanting to transmit messages at the same time by passing a token from node to node. However, the Token Ring network is not able to support broadcasting of messages to more then one node at a given time, a major drawback to systems which require messages to be sent to several nodes at one time.

A need thus exists for a contention free local area network which can be implemented without using complex hardware and/or software, which adds considerable cost to a communication system. The local area network should also be transparent to software and provide for high network utilization. The LAN should also allow for network efficiency not to be compromised when the network has a large number of nodes, and allow for the broadcasting of messages to more than one node at any given time.

SUMMARY OF THE INVENTION

Briefly, according to the invention, a method of transmitting a message in a communication network having a plurality of communication nodes comprises the steps of: determining if a transmit-enable token has been received at a control bus that is coupled to the communication node requesting to transmit the message; transmitting the message via a data bus which is coupled to the plurality of communication nodes, once the transmit-enable token has been received; and sending the transmit-enable token via the control bus to the next communication node, In another aspect of the invention, a communication system comprises a plurality of repeaters and a data bus coupled to the plurality of repeaters for allowing messages to be transmitted among the plurality of repeaters. The communication system further comprises a control bus coupled in a daisy-chain arrangement to the plurality of repeaters for allowing a token to be passed among the plurality of repeaters which is used to determine which of the repeaters can transmit a message via the data bus.

BRIEF DESCRIPTION OF THE DRAWINGS

FIG. 2 is a timing diagram showing tokens and request-to-send signals in accordance with the present invention.

DETAILED DESCRIPTION OF THE PREFERRED EMBODIMENT

Figure 1:
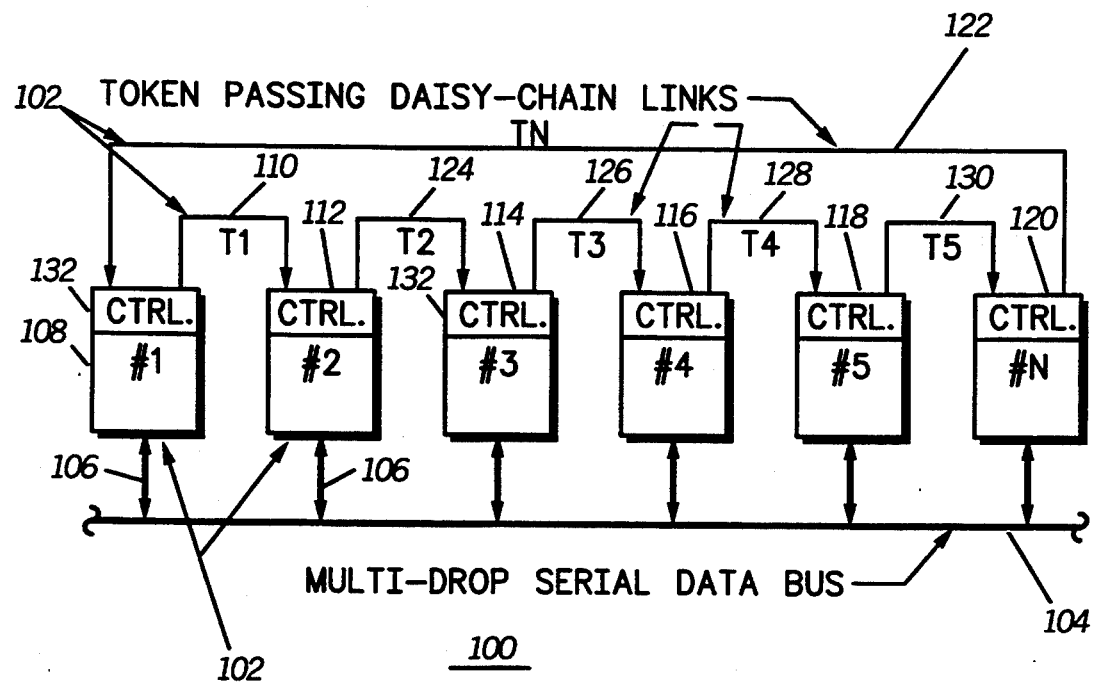
FIG. 1 is a diagram showing the basic architecture of a contention-free token passing network in accordance with the present invention.

Referring now to the drawings and specifically to FIG. 1, there is shown a block diagram of a communication system 100 which utilizes a token passing control bus and a multi-drop data bus in accordance with the present invention. System 100 consists of two separate types of communication links, a multi-drop bus 104 for the transport of data, and a daisy-chain ring control bus 102 for the transport of transmit-enable tokens. Daisy-chain ring 102 comprises sections 110, 124, 126, 128, 130 and 122. In the preferred embodiment, the network nodes 108, 112, 114, 116, 118 and 120, are preferably radio frequency repeaters such as those utilized in trunked radio frequency communication systems. Each of the repeaters includes a transmitter and receiver section for relaying radio frequency information. System 100 can have more than or fewer than the number of nodes shown, if desired.

Each of the individual nodes is linked to the multi-drop bus 104 via individual bus extensions 106. Multi-drop bus 104 preferably utilizes a serial bus architecture, although a parallel bus architecture could also be used if higher data transmission speeds are required.

Repeaters 108, 112, 114, 116, 118, and 120 communicate with each other in order to coordinate communication activity in the system. The repeaters pass a token via daisy-chain ring 102 in order to provide for contention-free communications among the repeaters. A "token" is nothing more than a positive voltage edge (e.g., a logic "0" to a logic "1" transition) on the inbound token passing link of a particular node. For example, communication link (T1) 110, is the inbound token passing link for node 112, while link (T2) 124 is the outbound token passing link for node 112. Control bus 102 is a uni-directional bus with the transmitenable token being passed among the repeaters in one direction of travel. Each of the repeaters receives the token via its inbound token passing link and generates a token which is sent via the repeater's outbound token passing link. The control of the token is controlled by a control means or control section 132 which is found in each of the repeaters. The control section will be discussed in detail later. The timing and operating scheme of the tokens may be best understood by looking at the timing diagram of FIG. 2.

In FIG. 2, when a particular node such as repeater #2 shown on FIG. 1, receives a positive voltage edge (e.g., from a zero voltage level state to a 5 volt level state) on its inbound token passing link T1, it changes the state of its outbound token passing link T2, from a logical "1" to a logical "0." This is shown in FIG. 2 by the positive voltage level in line T1 (202) and then looking at the outbound line T2 for node #2, where the voltage on line 204 goes from a "high" to a "low" level.

Line T1 (202) in FIG. 2, illustrates the logic levels present on inbound link 110 of node #2, while line T2 (204) illustrates the logic levels present on node #2's outbound token passing link T2. Each of the other lines of FIG. 2 show the logic levels present at their respective links (e.g., T3-TN).

After node #2 (112) changes its outbound token passing link logic level T2 (204) from a low logic level "0" to a high logic level "1", node #3 (114) gets its cue to change the logic on its outbound link T3 (206) from a logical "1" voltage level to a logical "0." This sequence of events continues throughout all of the remaining nodes in the network allowing for the token to be passed successively from node to node in a circular fashion (e.g., from node #1 to node #2, etc.).

In the preferred embodiment a logic level of "1" (or second voltage state) can equal a level of approximately 5 volts while a logical "0" level (or first voltage state) can be a voltage level of approximately 0 volts. Different voltages can be utilized depending on the system being designed. For example, a voltage range from 0 to 1.5 volts can signify a low voltage, while a voltage range from 3.5 to 5 volts can signify a high voltage level.

In the case that a particular communication node wishes to transmit a message when it receives the token, it keeps its outbound token passing link logic level at a high logic level for as long as it is transmitting a message (e.g., for node #2, the period between the time it begins transmission at line 226 and end transmission at line 228, at which point it asserts its outbound link T3 voltage at a low logic level). If a node receives the transmitenable token and it does not wish to transmit a message, the node places a low logic level on its outbound communication link a very short time (approximately one bit time) after receiving a positive voltage edge on its inbound token passing link, causing the token to be passed to the next node in the control bus. Thus, a node keeps a token to itself only while transmitting a message.

An example will help in clarifying the above situation. If nodes #5 (118) and node #2 (112) both want to transmit messages, nodes #5 and #2 signal their intentions to transmit messages, by lowering the logic levels on their respective RTS (request-to-send lines)lines shown by lines 214 and 216 respectively. Each of the repeaters preferably assert their RTS lines at a random time after determining that they need to transmit a message. By randomizing the time the RTS line is asserted low at each of the repeaters, allows for each repeater to get an equal opportunity of being the first to gather access to the token which is circulating the system via control bus 102. Line 214 in FIG. 2, shows the logic level at the RTS terminal for repeater #5 while line 216 shows the voltage level for the RTS terminal for repeater #2. Lines RTS1, RTS3, RTS4 and RTSN are all shown at a logic "1" indicating they are not requesting to transmit.

In this particular example, node (repeater) #5 is the first to receive the inbound token as shown by line number 218. Upon receipt of the inbound token from node #4 (shown by line 222), node #5 asserts its outbound token passing line low and begins transmitting a message on the multi-drop data bus 104 shown on FIG. 1. The outbound token also serves as the CTS (clear-to-send) line which enables the start of the message frame by node #5. Upon completion of the message as shown by the intersection of line number 224 and line 210, node #5 negates its RTS line (brings it back to a logic high "1" state, shown in line 214), which triggers the negation of the outbound token, shown by the shift from logic "1" to logic "0" in TN line 212.

The token has now been passed to node #N. Since node #N has nothing to transmit (its RTS line is at a logical "1", not shown), it passes its token to node #1 within a very short time. Node #1, in turn passes the token to node #2. Since node #2 does wish to transmit a message (its RTS line 216 is at a logic low), it holds on to the token until it has completed transmission, shown by line 226. At which point it negates its RTS line, and returns the voltage level on the outbound token passing link to a logic "0" level, shown by the shift in voltage level in line 206 at the point that node #2 completes transmission at line 228.

Under the above mentioned scheme, only one node in the network may possess a token at a given time. This allows only that one node transmits at any one point in time, thereby avoiding bus contention problems completely.

Figure 3:
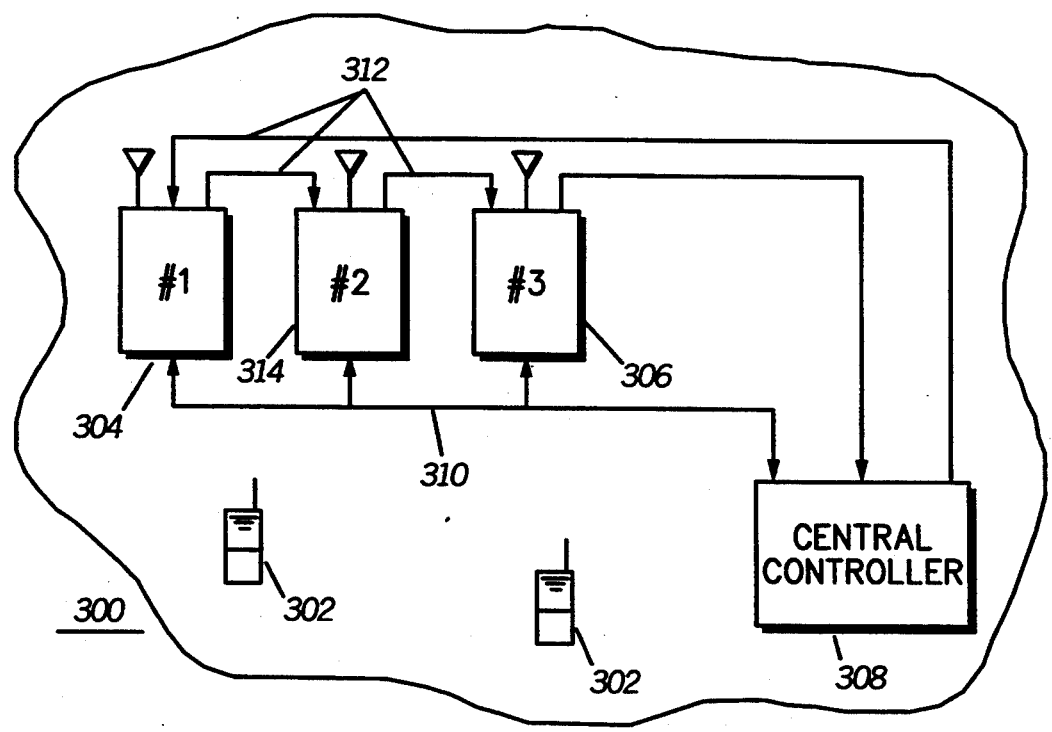
FIG. 3 is a diagram of a communication system in accordance with the present invention.

In FIG. 3, a communication system 300 utilizing a set of repeaters 304, 314 and 306 coupled together via a contention-free LAN as described above is shown. The LAN consists of a multi-drop bus 310 for the transport of data, and a daisy-chain ring 312 for the transport of tokens as previously discussed. Each of the repeaters is in communication to a trunked central controller 308 which controls the operation of repeaters 304, 314 and 306. The communication system also includes a set of subscriber radios 302 which can communicate with each other via one of the repeaters 304, 314, and 306. Preferably, communication system 300 is a trunked communication system as known in the art, with the addition of a contention-free LAN as described by the present invention.

The LAN network linking repeaters 304, 314 and 306 and system central controller 308 allows the communication units to stay in contention-free communication with each other.

Figure 4:
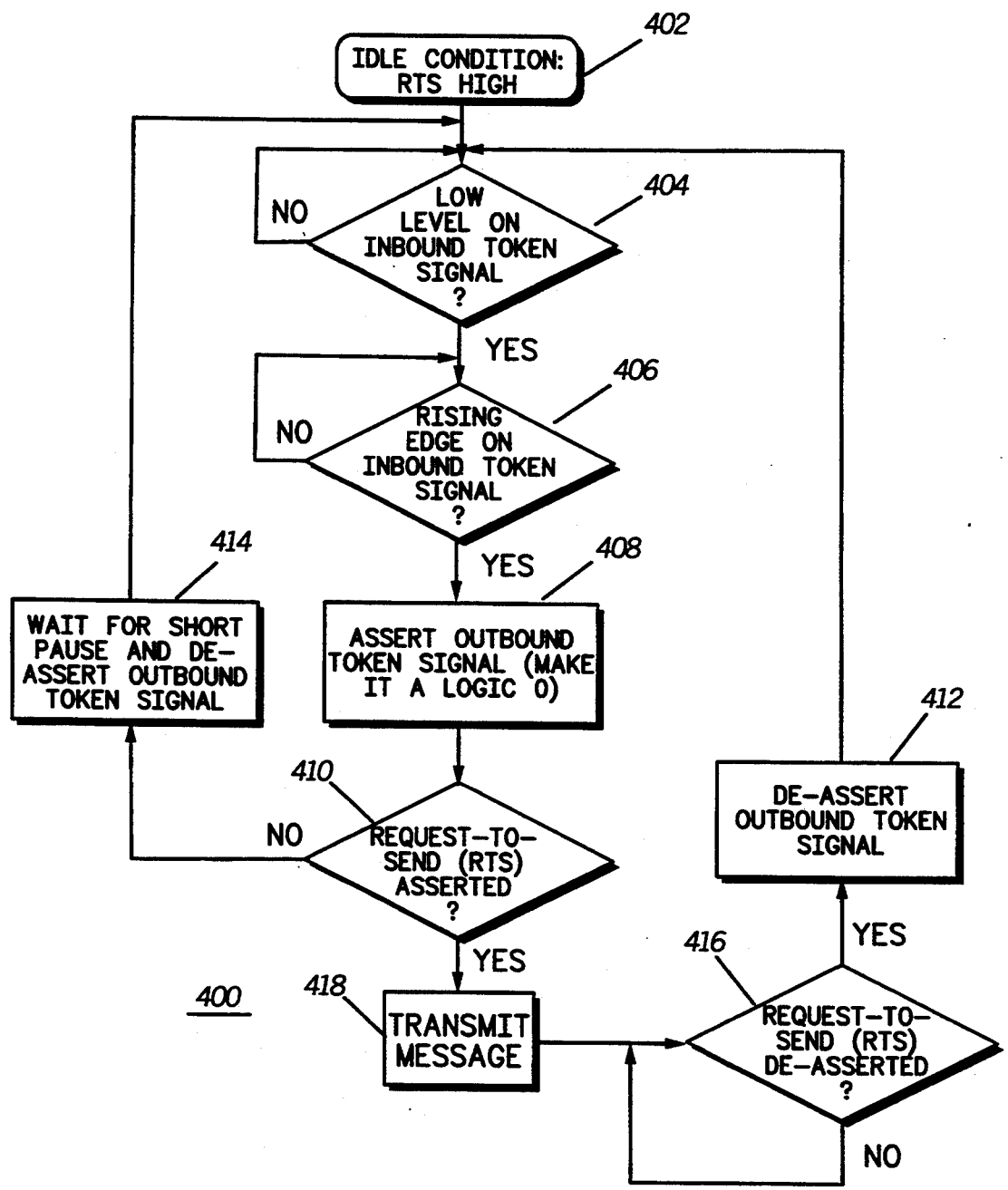
FIG. 4 is a flowchart illustrating the typical operation sequence for a typical communication node in accordance with the present invention.

In FIG. 4, a flowchart 400 showing the steps that are executed for contention-free transmission is shown. In step 402, the communication node is in an idle condition, given that the RTS line is at a logic "1" or high voltage level. The communication node then determines in step 404 there is a low logic level ("0") on its inbound token passing link. If the inbound token signal is high, the routine keeps waiting in step 404. If the inbound signal is at a low level, the routine moves on to step 406. In step 406, the node determines if their is a positive voltage edge on the inbound token signal (e.g., that the voltage level has changed from a "0" logic level to a "1" logic level). If the inbound token signal has a positive edge, the routine moves to step 408. In step 408, the communication node asserts the outbound token signal and makes it a logical "0."

In step 410, the decision is made whether the communication node is requesting to transmit a message via the data bus (RTS line asserted to a low logic level). If the communication node does not have a message to transmit (RTS is still at a high logic level) in step 414, the token is sent to the next communication node which is coupled to the control bus after a short pause (approximately equaling one clock cycle). The token is then sent to the next communication node by changing the voltage level on the communication node's outbound token passing link from a low to a high logic level. If in step 410, the communication has asserted its RTS line low, the communication node begins transmission of its message in step 418. In step 416, the RTS line is checked to determine if the message has finished being transmitted (RTS logic level changed from a low to a high logic level). If the RTS line has been de-asserted, the token is sent to the next communication node in step 412 by changing the voltage level on the outbound token passing link from a low to a high logic level.

Figure 5:
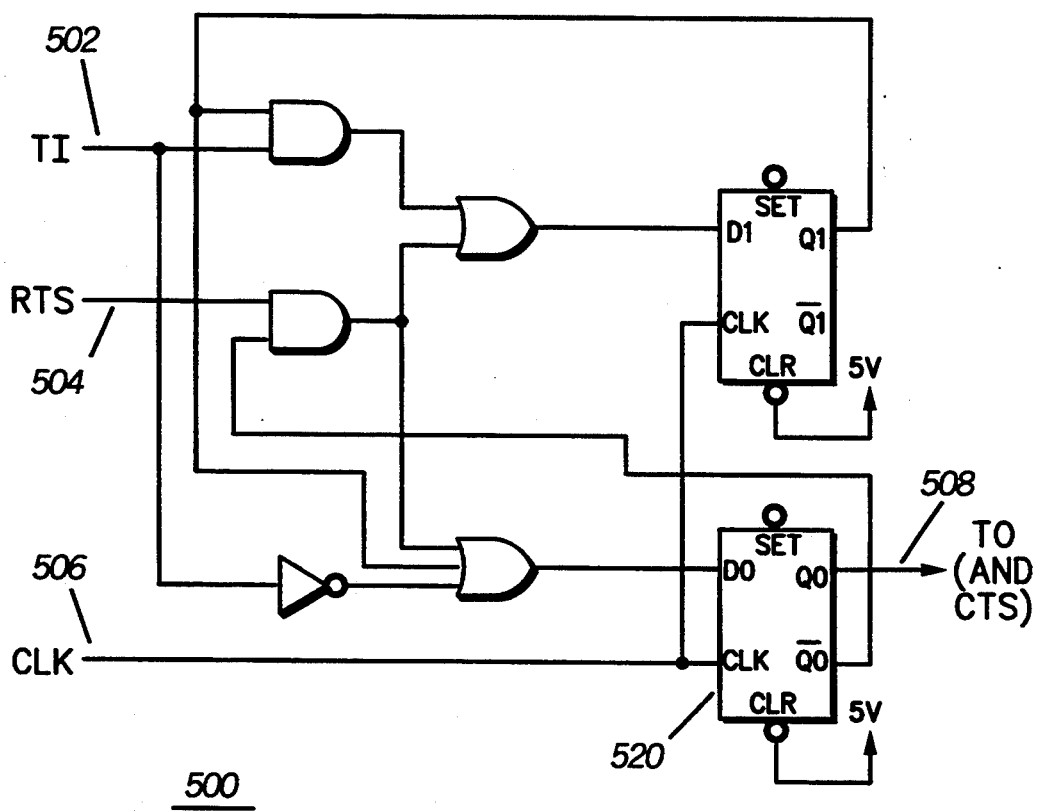
FIG. 5 is a preferred embodiment of a control circuit which provides contention-free data bus arbitration in accordance with the present invention.

In FIG. 5, a simplified schematic of a control circuit 500 for implementing the data bus arbitration process discussed above is shown. Circuit 500 is part of the communication nodes control means. Inputs to the data bus arbitration circuit include input "TI" 502, which is the voltage input from the communication nodes input token passing link (the input from the preceding node in the daisy-chain arrangement) and the RTS 504 input terminal which is coupled to a standard control line coming from the communication node (repeater) which informs circuit 500 that the repeater has a message to transmit.

In this particular embodiment, whenever the RTS line 504 is a logic "0" it indicates to control circuit 500 that the repeater wants to transmit a message. The final input to the circuit is a clock signal terminal 506 which is coupled to the repeater's internal clock circuitry in order to synchronize circuit 500 with the rest of the repeater's circuit. Output terminal TO 508 of circuit 500 provides the outbound token signal via the output token passing link to the next communication node (repeater) coupled to control bus 102 (e.g., assuming we are making reference to repeater #2 in FIG. 1, TI terminal 502 would be coupled to the output terminal TO of repeater #1 (108) while the output terminal TO 508 of node #2 would be coupled to the input terminal TI of repeater #3). The output token signal provided by output terminal TO 508 acts as the clear-to-send (CTS) signal to the next repeater coupled to control bus 102 informing the repeater that the token is now in its possession, allowing the next repeater to transmit a message if it cares to do so.

Each of the repeaters preferably also include a simple hardware relay feature (not shown) which will bypass circuit 500 and allow the token from the preceding node to be sent to the next node in the control bus if a node (repeater) becomes inoperative. This can simple take the form of a hardware circuit such as a relay circuit which links input TI 502 with output TO 508 in the case of a malfunction condition at a particular repeater. This would in effect cause the particular malfunctioning repeater to be bypassed in the control bus token passing sequence.

In communication systems such as the communication system previously discussed, the present invention allows for system software overhead to be minimized, since the handling of contention-free message transmissions between repeaters is simplified. This is especially important in communication systems having a large number of repeaters (e.g., over 10 repeaters).

Although the present invention has been shown implemented in a radio frequency system having several repeaters, the communication network of the present invention can also be utilized in other systems which require contention free communications. For example, the present invention can be utilized for linking computers and workstations together, in connecting system or backplane modules together which require effective communications, and other similar communication applications. In existing systems which are presently utilizing multi-drop buses for communications the described invention allows for a cost effective retrofit for providing contention-free communications.

In summary the present invention combines the advantages of ring and multi-drop local area networks in one configuration without suffering the disadvantages of either (e.g., such as the inability to broadcast with ring networks and the contention problems associated with multi-drop networks). The invention can be implemented with a simple and inexpensive hardware mechanism to eliminate contention. The invention also guarantees that dead time between consecutive messages remains less than (N-1) bit times, where "N" is the total number of communication nodes on the network. In practice, dead times will be significantly less than N-1 bit times, particularly when N is a large number (e.g., over 20).

What is claimed is:

1. A method of transmitting a message in a communication network having a plurality of communication nodes, the communication network including a multi-drop data bus interconnecting said plurality of communication nodes for allowing messages to be transmitted among said plurality of communication nodes, and a control bus comprising inbound and outbound token passing links coupled to each of said plurality of communication nodes in a daisy-chain arrangement which allows for a transmit-enable token to be passed along said plurality of communication nodes, the method of transmitting a message by a select one of said plurality of communication nodes comprising the steps of:

determining if the transmit-enable token has been received at the inbound token link that is coupled to said select one communication node which is requesting to transmit the message;

transmitting the message via said multi-drop data bus to each of said plurality of communication nodes, once the transmit-enable token has been received; and sending the transmit-enable token to the next communication node in the control bus daisy-chain arrangement via the outbound token passing link that is coupled to the communication node which has transmitted the message once the message is transmitted.

2. A method of transmitting a message by a communication node in a communication network as defined in claim 1, further comprising the step of:

randomly enabling a request-to-transmit signal when said select one communication node wants to transmit the message, the request-to-transmit signal causes said select one communication node to retain control of the transmit-enable token until the message has been transmitted.

3. A method of transmitting a message by a communication node in a communication network as defined in claim 2, wherein the step of determining that the transmit-enable token has been received comprises determining if a voltage level on the inbound token passing link has changed from a first voltage state to a second voltage state.

4. A method of transmitting a message in a communication network having a plurality of communication nodes, the communication network including a multi-drop data bus interconnecting said plurality of communication nodes for allowing messages to be transmitted among said plurality of radio frequency repeaters, and a control bus comprising inbound and outbound token passing links coupled to each of said plurality of communication nodes in a daisy-chain arrangement which allows for a transmit-enable token to be passed along said plurality of communication nodes, the method of transmitting a message comprising the steps of:

enabling a request-to-send signal at a select one of said plurality of communication nodes which is requesting to transmit a message;

determining if the transmit-enable token has been received via the inbound token passing link which is coupled to the said select one communication node;

transmitting the message via the multi-drop data bus to each of said plurality of communication nodes, if the transmit enable token has been received;

disabling the request-to-send signal upon having completed transmission of the message; and sending the transmit-enable token via the outbound token passing link which is coupled to the said select one communication node.

5. A method of transmitting a message in a communication network as defined in claim 4, wherein the step of enabling the request-to-send signal is done randomly in time.

6. A method of transmitting a message in a communication network as defined in claim 4, wherein the step of determining if the transmit-enable token has been received comprises determining if a voltage level in the inbound token passing link of the communication node requesting to transmit the message has changed from a first voltage state to a second voltage state.

7. A method of transmitting a message in a communication network as defined in claim 6, comprising the further step of:

maintaining possession of the transmit-enable token until the message has been transmitted by maintaining a voltage level present at an outbound token passing link which is coupled to the communication node transmitting the message at a first voltage state while the message is being transmitted.

8. A method of transmitting a message in a communication network as defined in claim 7, wherein the step of sending the transmit-enable token via the outbound token passing link to the next communication node in the control bus daisy-chain arrangement comprises changing the voltage level in the outbound token passing link from the first voltage state back to the second voltage state.

9. A communication system, comprising:

a plurality of radio frequency repeaters for relaying radio frequency information signals;

a multi-drop data bus interconnecting said plurality of radio frequency repeaters for allowing messages to be transmitted among said plurality of radio frequency repeaters; and a control bus coupled in a daisy-chain arrangement to said plurality of radio frequency repeaters for allowing a token to be passed among said plurality of radio frequency repeaters, said plurality of radio frequency repeaters each including a control means responsive to the reception of the token for allowing a radio frequency repeater from among said plurality of radio frequency repeaters which has received the token and is requesting to transmit a message via said multi-drop data bus.

10. A communication system as defined in claim 9, wherein if one or more, but not all, of the radio frequency repeaters becomes inoperative, the data bus will continue to allow messages to be transmitted among said radio frequency repeaters that are still operative and the control bus will continue to allow the token to be passed among said radio frequency repeaters which are still operative.

11. A communication system as defined in claim 9, wherein the control bus comprises a set of inbound and outbound token passing links coupled to each of said radio frequency repeaters and the control means determines if a token has been received at a particular radio frequency repeater from among the plurality of radio frequency repeaters by determining if a voltage level present at the inbound token passing link of the particular repeater has changed from a first voltage level to a second voltage level.

* * * * *